(12) United States Patent
Elias

(10) Patent No.: US 8,957,874 B2
(45) Date of Patent: Feb. 17, 2015

(54) TOUCH SENSOR PANEL DESIGN

(75) Inventor: John Greer Elias, Townsend, DE (US)

(73) Assignee: Apple Inc., Cupertino, CA (US)

( * ) Notice: Subject to any disclaimer, the term of this patent is extended or adjusted under 35 U.S.C. 154(b) by 1129 days.

(21) Appl. No.: 12/494,173

(22) Filed: Jun. 29, 2009

(65) Prior Publication Data
US 2010/0328228 A1 Dec. 30, 2010

(51) Int. Cl.
G06F 3/045 (2006.01)
G06F 3/044 (2006.01)

(52) U.S. Cl.
CPC ........................... *G06F 3/044* (2013.01)
USPC .......................... 345/174; 345/175

(58) Field of Classification Search
USPC ................ 345/173–179; 178/18.01–18.07, 178/20.01–20.04
See application file for complete search history.

(56) References Cited

U.S. PATENT DOCUMENTS

| 4,087,625 | A | 5/1978 | Dym et al. |
|---|---|---|---|
| 4,090,092 | A | 5/1978 | Serrano |
| 4,304,976 | A | 12/1981 | Gottbreht et al. |
| 4,475,235 | A | 10/1984 | Graham |
| 4,659,874 | A | 4/1987 | Landmeier |
| 5,194,862 | A | 3/1993 | Edwards |
| 5,317,919 | A | 6/1994 | Awtrey |
| 5,459,463 | A | 10/1995 | Gruaz et al. |
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,841,078 | A | 11/1998 | Miller et al. |
| 5,844,506 | A | 12/1998 | Binstead |
| 5,880,411 | A | 3/1999 | Gillespie et al. |
| 6,137,427 | A | 10/2000 | Binstead |
| 6,163,313 | A | 12/2000 | Aroyan et al. |
| 6,188,391 | B1 | 2/2001 | Seely et al. |

(Continued)

FOREIGN PATENT DOCUMENTS

| CN | 1672119 A | 9/2005 |
|---|---|---|
| CN | 1711520 A | 12/2005 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Vijay Shankar
(74) *Attorney, Agent, or Firm* — Morrison & Foerster, LLP

(57) ABSTRACT

A touch sensor panel including a plurality of drive lines crossing a plurality of sense lines, forming an array, is disclosed. The plurality of drive lines and the plurality of sense lines are formed by interconnecting a plurality of substantially transparent conductive sections having a first resistivity. A substantially transparent conductive material, with a second resistivity that is lower than the first resistivity, is deposited over at least part of at least one of the plurality of substantially transparent conductive sections of at least one of the plurality of drive lines and the plurality of sense lines. A second layer of the substantially transparent conductive material, with the second resistivity, can be deposited thereafter. At least one dummy section is disposed in an area of the touch sensor panel around the conductive sections of at least one of the plurality of drive lines and the plurality of sense lines.

12 Claims, 11 Drawing Sheets

(56) References Cited

U.S. PATENT DOCUMENTS

| | | |
|---|---|---|
| 6,310,610 B1 | 10/2001 | Beaton et al. |
| 6,323,846 B1 | 11/2001 | Westerman et al. |
| 6,452,514 B1 | 9/2002 | Philipp |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,184,064 B2 | 2/2007 | Zimmerman et al. |
| 7,538,760 B2 | 5/2009 | Hotelling et al. |
| 7,548,073 B2 | 6/2009 | Mackey et al. |
| 7,639,234 B2 | 12/2009 | Orsley |
| 7,663,607 B2 | 2/2010 | Hotelling et al. |
| 7,864,503 B2 | 1/2011 | Chang |
| 7,932,898 B2 | 4/2011 | Philipp et al. |
| 8,120,371 B2 | 2/2012 | Day et al. |
| 8,223,133 B2 | 7/2012 | Hristov |
| 8,258,986 B2 | 9/2012 | Makovetsky |
| 8,259,078 B2 | 9/2012 | Hotelling et al. |
| 8,283,935 B2 | 10/2012 | Liu et al. |
| 8,319,747 B2 | 11/2012 | Hotelling et al. |
| 8,479,122 B2 | 7/2013 | Hotelling et al. |
| 8,487,898 B2 | 7/2013 | Hotelling |
| 8,593,425 B2 | 11/2013 | Hong et al. |
| 2003/0076325 A1 | 4/2003 | Thrasher |
| 2004/0017362 A1 | 1/2004 | Mulligan et al. |
| 2004/0090429 A1 | 5/2004 | Geaghan et al. |
| 2004/0119701 A1 | 6/2004 | Mulligan et al. |
| 2004/0239650 A1* | 12/2004 | Mackey ............ 345/174 |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0126831 A1 | 6/2005 | Richter et al. |
| 2005/0146509 A1 | 7/2005 | Geaghan et al. |
| 2005/0270039 A1 | 12/2005 | Mackey |
| 2005/0280639 A1 | 12/2005 | Taylor et al. |
| 2006/0026521 A1 | 2/2006 | Hotelling et al. |
| 2006/0038791 A1 | 2/2006 | Mackey |
| 2006/0097991 A1 | 5/2006 | Hotelling et al. |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0278444 A1 | 12/2006 | Binstead |
| 2007/0008299 A1 | 1/2007 | Hristov |
| 2007/0012665 A1 | 1/2007 | Nelson et al. |
| 2007/0074914 A1 | 4/2007 | Geaghan et al. |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0279395 A1 | 12/2007 | Philipp |
| 2007/0283832 A1 | 12/2007 | Hotelling |
| 2008/0024456 A1 | 1/2008 | Peng et al. |
| 2008/0062140 A1 | 3/2008 | Hotelling et al. |
| 2008/0074398 A1 | 3/2008 | Wright |
| 2008/0136787 A1 | 6/2008 | Yeh et al. |
| 2008/0158167 A1 | 7/2008 | Hotelling et al. |
| 2008/0158181 A1 | 7/2008 | Hamblin et al. |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0309633 A1* | 12/2008 | Hotelling et al. ............ 345/173 |
| 2008/0309635 A1 | 12/2008 | Matsuo |
| 2009/0002337 A1* | 1/2009 | Chang ............ 345/174 |
| 2009/0019344 A1 | 1/2009 | Yoon et al. |
| 2009/0054107 A1 | 2/2009 | Feland et al. |
| 2009/0085894 A1 | 4/2009 | Gandhi et al. |
| 2009/0091551 A1 | 4/2009 | Hotelling et al. |
| 2009/0135157 A1 | 5/2009 | Harley |
| 2009/0182189 A1* | 7/2009 | Lira ............ 600/27 |
| 2009/0184937 A1 | 7/2009 | Grivna |
| 2009/0205879 A1 | 8/2009 | Halsey, IV et al. |
| 2009/0236151 A1 | 9/2009 | Yeh et al. |
| 2009/0242283 A1 | 10/2009 | Chiu |
| 2009/0267902 A1 | 10/2009 | Nambu et al. |
| 2009/0273577 A1 | 11/2009 | Chen et al. |
| 2009/0303189 A1 | 12/2009 | Grunthaner et al. |
| 2009/0309850 A1 | 12/2009 | Yang |
| 2009/0314621 A1 | 12/2009 | Hotelling |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0007616 A1 | 1/2010 | Jang |
| 2010/0059294 A1 | 3/2010 | Elias et al. |
| 2010/0079384 A1 | 4/2010 | Grivna |
| 2010/0110035 A1 | 5/2010 | Selker |
| 2010/0117985 A1 | 5/2010 | Wadia |
| 2010/0143848 A1 | 6/2010 | Jain et al. |
| 2010/0149108 A1 | 6/2010 | Hotelling et al. |
| 2010/0194696 A1 | 8/2010 | Chang et al. |
| 2010/0253638 A1 | 10/2010 | Yousefpor et al. |
| 2010/0328248 A1 | 12/2010 | Mozdzyn |
| 2011/0007020 A1 | 1/2011 | Hong et al. |
| 2011/0096016 A1 | 4/2011 | Yilmaz |
| 2011/0134050 A1 | 6/2011 | Harley |
| 2012/0026099 A1 | 2/2012 | Harley |
| 2012/0113047 A1 | 5/2012 | Hanauer |
| 2013/0120303 A1 | 5/2013 | Hong et al. |

FOREIGN PATENT DOCUMENTS

| | | |
|---|---|---|
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| DE | 11 2008 001 245 T5 | 3/2010 |
| EP | 0 853 230 A1 | 7/1998 |
| EP | 1 192 585 A1 | 4/2002 |
| EP | 1 573 706 A1 | 2/2004 |
| EP | 1 644 918 A2 | 12/2004 |
| EP | 1 986 084 A1 | 10/2008 |
| EP | 2 077 489 A1 | 7/2009 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2450207 A | 12/2008 |
| JP | 2000-163031 A | 6/2000 |
| JP | 2002-342033 A | 11/2002 |
| JP | 2004-503835 A | 2/2004 |
| JP | 2005-084128 A | 3/2005 |
| JP | 2007-018515 A | 1/2007 |
| JP | 2008-510251 A | 4/2008 |
| TW | M344522 | 11/2008 |
| TW | M344544 | 11/2008 |
| WO | WO-01/97204 A1 | 12/2001 |
| WO | WO-2005/114369 A2 | 12/2005 |
| WO | WO-2005/114369 A3 | 12/2005 |
| WO | WO-2006/023147 A3 | 3/2006 |
| WO | WO-2006/104745 A3 | 10/2006 |
| WO | WO-2006/130584 A3 | 12/2006 |
| WO | WO-2007/012899 A1 | 2/2007 |
| WO | WO-2007/034591 A1 | 3/2007 |
| WO | WO-2007/115032 A2 | 10/2007 |
| WO | WO-2007/146785 A2 | 12/2007 |
| WO | WO-2008/007118 A3 | 1/2008 |
| WO | WO-2008/076237 A3 | 6/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/117882 A2 | 10/2010 |

OTHER PUBLICATIONS

Rubine, D.H. (Dec. 1991). "The Automatic Recognition of Gestures," CMU-CS-91-202, Submitted in Partial Fulfillment of the

(56) References Cited

OTHER PUBLICATIONS

Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action mailed Feb. 1, 2013, for U.S. Appl. No. 12/642,466, filed Dec. 18, 2009, nine pages.
Final Office Action mailed Jan. 27, 2014, for U.S. Appl. No. 12/206,680, filed Sep. 8, 2008, 20 pages.
International Search Report mailed May 2, 2011, for PCT Application No. PCT/US2010/058988, filed Dec. 3, 2010, five pages.
Non-Final Office Action mailed Aug. 28, 2012, for U.S. Appl. No. 12/642,466, filed Dec. 18, 2009, nine pages.
Non-Final Office Action mailed Sep. 6, 2013, for U.S. Appl. No. 12/847,987, filed Jul. 30, 2010, 15 pages.
Non-Final Office Action mailed Nov. 8, 2013, for U.S. Appl. No. 12/642,466, filed Dec. 18, 2009, 12 pages.
Non-Final office Action mailed Dec. 19, 2013, for U.S. Appl. No. 12/545,604, filed Aug. 21, 2009, 17 pages.
Final Office Action mailed Apr. 23, 2014 for U.S. Appl. No. 12/847,987, filed Jul. 30, 2010, 16 pages.
Non-Final Office Action mailed Apr. 10, 2014, for U.S. Appl. No. 14/055,717, filed Oct. 16, 2013, 10 pages.
Non-Final Office Action mailed Sep. 30, 2013, for U.S. Appl. No. 12/206,680, filed Sep. 8, 2008, 18 pages.
Cassidy, R. (Feb. 23, 2007). "The Tissot T-Touch Watch—A Groundbreaking Timepiece," located at <http://ezinearticles.com/?The-Tissot-T-Touch-Watch---AGroundbreaking-Timepiece&id . . . >, last visited Jan. 23, 2009, two pages.
Chinese Search Report completed Jun. 3, 2011, for CN Patent Application No. ZL2009201524013, with English Translation, 20 pages.
Chinese Search Report mailed Jan. 10, 2011, for CN Application No. 2008201338142, filed Sep. 27, 2008, with English Translation, 25 pages.
Chinese Search Report mailed Jan. 7, 2011, for CN Application No. 2009200081997, filed Apr. 24, 2009, with English Translation, 14 pages.
European Search Report mailed Mar. 19, 2009, for EP Application No. 08017396.6, filed Oct. 8, 2008, seven pages.
Final Office Action mailed Jun. 8, 2011, for U.S. Appl. No. 12/038,760, filed Feb. 27, 2008, 20 pages.
Final Office Action mailed Dec. 15, 2011, for U.S. Appl. No. 12/333,250, filed Dec. 11, 2008, 12 pages.
Final Office Action mailed Jan. 5, 2012, for U.S. Appl. No. 12/206,680, filed Sep. 8, 2008, 15 pages.
Final Office Action mailed Jan. 19, 2012, for U.S. Appl. No. 12/110,024, filed Apr. 25, 2008, 12 pages.
Final Office Action mailed Aug. 31, 2012, for U.S. Appl. No. 12/110,075, filed Apr. 25, 2008, 15 pages.
Final Office Action mailed Dec. 24, 2012, for U.S. Appl. No. 12/110,024, filed Apr. 25, 2008, 21 pages.
Final Office Action mailed Jan. 3, 2013, for U.S. Appl. No. 11/818,498, filed Jun. 13, 2007, 17 pages.
Final Office Action mailed Feb. 5, 2013, for U.S. Appl. No. 12/500,911, filed Jul. 10, 2009, 15 pages.
Final Office Action mailed May 22, 2013, for U.S. Appl. No. 12/206,680, filed Sep. 8, 2008, 16 pages.
Final Office Action mailed Jul. 19, 2013, for U.S. Appl. No. 12/545,604, filed Aug. 21, 2009, 17 pages.
Great Britain Search Report mailed Jan. 19, 2009, for GB Application No. GB0817242.1, filed Sep. 22, 2008, two pages.
Great Britain Search Report mailed Jan. 19, 2010, for GB Application No. GB0817242.1, filed Sep. 22, 2008, two pages.
International Search Report mailed Aug. 5, 2009, for PCT Application No. PCT/US2009/041465, filed Apr. 22, 2009, four pages.
International Search Report mailed Jan. 14, 2011, for PCT Application No. PCT/US2010/029698, filed Apr. 1, 2010, 4 pages.
International Search Report mailed Jul. 17, 2009, for PCT Application No. PCT/US2009/041460, three pages.
International Search Report mailed on Mar. 19, 2009, for PCT Application No. PCT/US2008/078836, filed on Oct. 3, 2008, four pages.
Non-Final Office Action mailed Feb. 4, 2011, for U.S. Appl. No. 12/038,760, filed Feb. 27, 2008, 18 pages.
Non-Final Office Action mailed Jun. 9, 2011, for U.S. Appl. No. 12/206,680, filed Sep. 8, 2008, 13 pages.
Non-Final Office Action mailed Jul. 8, 2011, for U.S. Appl. No. 12/110,075, filed Apr. 25, 2008, 14 pages.
Non-Final Office Action mailed Jul. 11, 2011, for U.S. Appl. No. 12/110,024, filed Apr. 25, 2008, 12 pages.
Non-Final Office Action mailed Aug. 17, 2011, for U.S. Appl. No. 12/333,250, filed Dec. 11, 2008, 12 pages.
Non-Final Office Action mailed Jan. 25, 2012, for U.S. Appl. No. 12/110,075, filed Apr. 25, 2008, 21 pages.
Non-Final Office Action mailed May 25, 2012, for U.S. Appl. No. 11/818,498, filed Jun. 13, 2007, 16 pages.
Non-Final Office Action mailed Jun. 7, 2012, for U.S. Appl. No. 12/500,911, filed Jul. 10, 2009, 16 pages.
Non-Final Office Action mailed Jul. 3, 2012, for U.S. Appl. No. 12/110,024, filed Apr. 25, 2008, 19 pages.
Non-Final Office Action mailed Sep. 26, 2012, for U.S. Appl. No. 12/206,680, filed Sep. 8, 2008, 14 pages.
Non-Final Office Action mailed Jan. 2, 2013, for U.S. Appl. No. 12/038,760, filed Feb. 27, 2008, 20 pages.
Non-Final office Action mailed Jan. 7, 2013, for U.S. Appl. No. 12/545,604, filed Aug. 21, 2009, 12 pages.
Non-Final Office Action mailed Mar. 28, 2013, for U.S. Appl. No. 12/110,075, filed Apr. 25, 2008, 14 pages.
Non-Final Office Action mailed Mar. 29, 2013 for U.S. Appl. No. 13/737,779, filed Jan. 9, 2013, nine pages.
Notice of Allowance mailed Aug. 28, 2012, for U.S. Appl. No. 12/333,250, filed Dec. 11, 2008, nine pages.
Notice of Allowance mailed May 23, 2013, for U.S. Appl. No. 12/110,024, filed Apr. 25, 2008, five pages.
Notice of Allowance mailed Aug. 19, 2013, for U.S. Appl. No. 12/500,911, filed Jul. 10, 2009, six pages.
Notice of Allowance mailed Sep. 3, 2013, for U.S. Appl. No. 13/737,779, filed Jan. 9, 2013, 10 pages.
Search Report mailed Apr. 29, 2009, for NL Application No. 2001672, with English translation of Written Opinion, eight pages.
Final Office Action mailed May 9, 2014, for U.S. Appl. No. 12/642,466, filed Dec. 18, 2009, 13 pages.
Final Office Action mailed Jul. 16, 2014, for U.S. Appl. No. 12/545,604, filed Aug. 21, 2009, 18 pages.

* cited by examiner

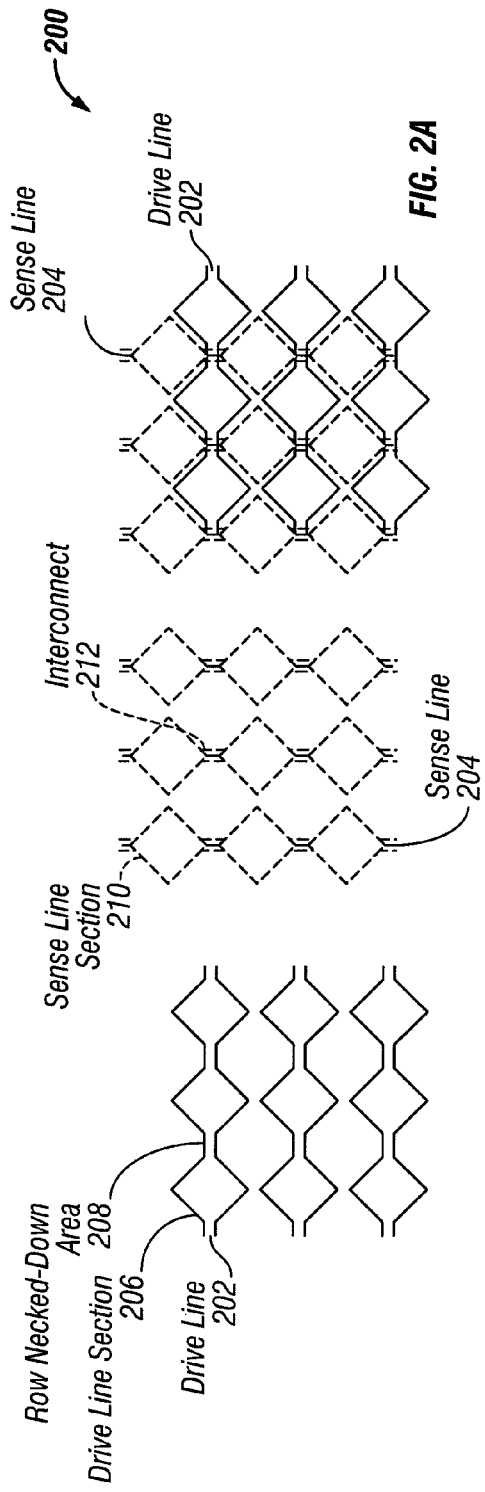
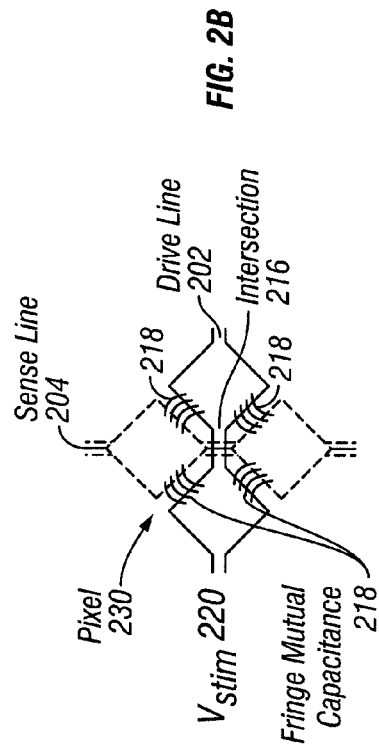

TOUCH SENSOR PANEL DESIGN

FIELD

This relates generally to touch sensor panels, and in particular, to touch sensor panel designs that can improve touch sensitivity and reduce negative optical artifacts.

BACKGROUND

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material such as Indium Tin Oxide (ITO), often arranged in rows and columns in horizontal and vertical directions on a substantially transparent substrate. Signals transmitted through the drive lines pass through the static mutual capacitance at the crossover points (sensing pixels) of the drive lines and the sense lines. The static mutual capacitance, and any changes to the static mutual capacitance due to a touch event, can be determined from sense signals that are generated in the sense lines due to the drive signals.

In order to minimize negative visual effects on the LCD image, the ITO forming the touch sensing pixels should not introduce any color shift, moiré, or visual artifacts of any kind. Ideally, the ITO pixel layer should be invisible to the human eye. To achieve this goal, the thickness of the ITO layer must be less than the thickness threshold where negative visual effects such as color shift become apparent. In large touch screens, because of the large distance over which the ITO must span, the electrical resistance of the drive and sense lines can become so large that the resulting resistance and capacitance (RC) time constant reduces the rate at which the touch screen can be scanned. This can lead to slow response to user input and overall poor system performance. A solution to reducing the RC time constant is to use a thicker ITO coating. However, a uniformly thicker ITO would also introduce an undesirable color shift along with some reduction in overall light transmission.

SUMMARY

A goal of this disclosure is to reduce the RC time constant without introducing visual artifact. This can be achieved by applying variable thickness ITO in non-regular, semi-random, or sparse arrangements on the surface of the panel. Embodiments disclosed herein relate to a touch sensor panel including a plurality of drive lines crossing a plurality of sense lines, forming an array. The plurality of drive lines and the plurality of sense lines can be formed by interconnecting a plurality of substantially transparent conductive sections having a first resistivity, using conductive interconnects. A substantially transparent conductive material, with a second resistivity that is lower than the first resistivity, can be deposited over at least part of at least one of the plurality of substantially transparent conductive sections of at least one of the plurality of drive lines and the plurality of sense lines. In this manner, the overall resistivity can be reduced within the section(s). Any number of additional layers of substantially transparent conductive material can be deposited over at least part of the conductive sections. The conductive interconnects can be insulated from each other and can be formed of the substantially transparent conductive material or an opaque metal covered with a black mask or other non-reflective material. At least one dummy section can be disposed in an area of the touch sensor panel around the conductive sections of at least one of the plurality of drive lines and the plurality of sense lines, in order to reduce parasitic capacitance and provide uniformity, thus minimizing visual artifacts.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 2(a) illustrates an exemplary arrangement of drive and sense lines on the same side of a single substrate according to various embodiments.

FIG. 2(b) illustrates an exemplary pixel generated from diamond-shaped drive and sense lines on the same side of a single substrate according to various embodiments.

DETAILED DESCRIPTION

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

This relates to the formation of touch sensor panels, and in some embodiments, larger-size touch sensor panels. Embodiments described herein are directed to a touch sensor panel that can include a plurality of drive lines crossing a plurality of sense lines, forming an array. The plurality of drive lines and the plurality of sense lines can be formed by interconnecting a plurality of substantially transparent conductive sections having a first resistivity. A substantially transparent conductive material, with a second resistivity that is lower than the first resistivity, can be deposited over at least part of at least one of the plurality of substantially transparent conductive sections of at least one of the plurality of drive lines and the plurality of sense lines. In this manner, the overall resistivity can be reduced within the section(s). At least one dummy section can be disposed in an area of the touch sensor panel around the conductive sections of at least one of the plurality of drive lines and the plurality of sense lines, in order to reduce parasitic capacitance and to provide uniformity, thus minimizing visual artifacts.

Although embodiments may be described and illustrated herein in terms of mutual capacitance touch sensor panels, it should be understood that the various embodiments are not so limited, but are additionally applicable to self-capacitance sensor panels, single and multi-touch sensor panels, and other sensors in which multiple simultaneous stimulation signals are used to generate a composite sense signal. Furthermore, it should be understood that various embodiments are also applicable to various touch sensor panel configurations, such as configurations in which the drive and sense lines are formed in non-orthogonal arrangements, on the back of a cover glass, on the same side of a single substrate, or integrated with display circuitry.

Figure 1:
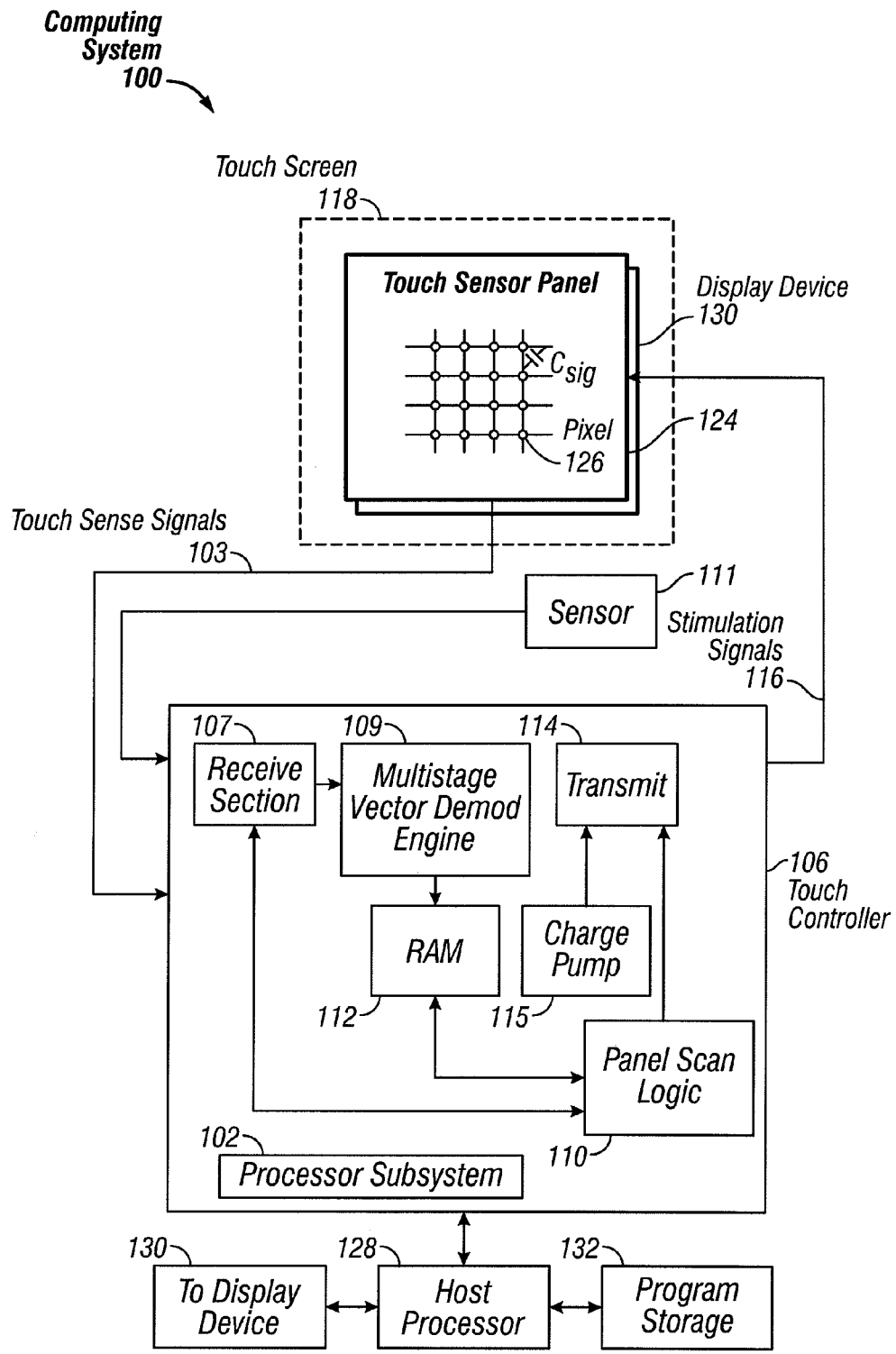
FIG. 1 illustrates an example computing system according to various embodiments.

FIG. 1 illustrates example computing system 100 that can utilize multi-touch controller 106 with integrated drive system according to various embodiments. Touch controller 106 can be a single application specific integrated circuit (ASIC) that can include one or more processor subsystems 102, which can include, for example, one or more main processors, such as ARM968 processors or other processors with similar functionality and capabilities. However, in other embodiments, the processor functionality can be implemented instead by dedicated logic, such as a state machine. Processor subsystems 102 can also include, for example, peripherals (not shown) such as random access memory (RAM) or other types of memory or storage, watchdog timers and the like. Touch controller 106 can also include, for example, receive section 107 for receiving signals, such as touch sense signals 103 from the sense lines of touch sensor panel 124, other signals from other sensors such as sensor 111, etc. Touch controller 106 can also include, for example, a demodulation section such as multistage vector demod engine 109, panel scan logic 110, and a drive system including, for example, transmit section 114. Panel scan logic 110 can access RAM 112, autonomously read data from the sense channels and provide control for the sense channels. In addition, panel scan logic 110 can control transmit section 114 to generate stimulation signals 116 at various frequencies and phases that can be selectively applied to the drive lines of touch sensor panel 124.

Charge pump 115 can be used to generate the supply voltage for the transmit section. Stimulation signals 116 (Vstim) can have amplitudes higher than the maximum voltage the ASIC process can tolerate by cascoding transistors. Therefore, using charge pump 115, the stimulus voltage can be higher (e.g. 6V) than the voltage level a single transistor can handle (e.g. 3.6V). Although FIG. 1 shows charge pump 115 separate from transmit section 114, the charge pump can be part of the transmit section.

Touch sensor panel 124 can include a capacitive sensing medium having a plurality of drive lines and a plurality of sense lines. The drive and sense lines can be formed from a transparent conductive medium such as Indium Tin Oxide (ITO) or Antimony Tin Oxide (ATO), although other transparent and non-transparent materials such as copper can also be used. In some embodiments, the drive and sense lines can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "drive lines" and "sense lines" as used herein are intended to encompass not only orthogonal grids, but the intersecting traces of other geometric configurations having first and second dimensions (e.g. the concentric and radial lines of a polar-coordinate arrangement). The drive and sense lines can be formed on, for example, a single side of a substantially transparent substrate.

At the "intersections" of the traces, where the drive and sense lines can pass adjacent to and above and below (cross) each other (but without making direct electrical contact with each other), the drive and sense lines can essentially form two electrodes (although more than two traces could intersect as well). Each intersection of drive and sense lines can represent a capacitive sensing node and can be viewed as picture element (pixel) 126, which can be particularly useful when touch sensor panel 124 is viewed as capturing an "image" of touch. (In other words, after touch controller 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between drive and sense electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 100 can also include host processor 128 for receiving outputs from processor subsystems 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. In some embodiments, host processor 128 can be a separate component from touch controller 106, as shown. In other embodiments, host processor 128 can be included as part of touch controller 106. In still other embodiments, the functions of host processor 128 can be performed by processor subsystem 102 and/or distributed among other components of touch controller 106. Display device 130 together with touch sensor panel 124, when located partially or entirely under the touch sensor panel, can form touch screen 118.

Note that one or more of the functions described above can be performed, for example, by firmware stored in memory (e.g., one of the peripherals) and executed by processor subsystem 102, or stored in program storage 132 and executed by host processor 128. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

According to an embodiment of the present disclosure, the drive and sense lines of touch sensor panel 124 can be formed of diamond-shaped or truncated diamond-shaped sections of ITO, for example, that are interconnected. FIG. 2a illustrates exemplary arrangement 200 of diamond-shaped drive and sense lines on the same layer and side of a single substrate. Note that the spatial density of pixels in the arrangement can be made similar to previously disclosed sensor panels, as spatial density can be dependent on the geometry of the diamond-shaped drive and sense lines. Note also that FIG. 2a shows diamond-shaped drive lines 202 and diamond-shaped sense lines 204 separately and superimposed at 200; however, drive lines 202 and sense lines 204 can be disposed on the same layer. Further, diamond-shaped sections of the drive and sense lines are depicted for exemplary purposes; however, various shapes of the sections can be used. In general, reducing the surface area of a section at its widest point (e.g., chopping off the corners of the diamond) where the sheet resistance in Ohms per square is lowest can reduce parasitic mutual capacitance without significantly increasing the overall resistance of the section. In addition, through RC time constant simulations, it has been determined that increasing the width of necked-down area 208, for example, as much as possible, can increase conductance, thus reducing resistance, as compared to narrower necked-down areas 208.

In FIG. 2a, each drive line 202 can be formed from areas of substantially transparent ITO 206 ("sections" 206) connected at adjacent facing points by necked-down area 208, although conductive material other than ITO can also be used. Each sense line 204 can be similarly formed from areas of substantially transparent ITO 210 ("sections" 210) or other conductive material connected at adjacent facing points by interconnectors 212 (described in greater detail below), which "jump over" the interconnected drive lines sections 206 at necked-down area 208. Sense lines 204 can be connected to a preamplifier held at a virtual ground of, for example, 1.5V, and one or more drive lines 202 can be stimulated with the others held at direct current (DC) voltage levels.

FIG. 2b illustrates exemplary pixel 230 generated from diamond-shaped drive lines 202 and sense lines 204 on the same side of a single substrate according to various embodiments. If drive lines 202 is stimulated with a stimulation signal Vstim 220, a static mutual capacitance can be formed at intersection 216 of the necked-down areas. The static mutual capacitance at intersection 216 can be undesirable because a finger may not be able to block many of the fringing fields. Accordingly, in this embodiment the necked-down areas are made as small as possible; however, alternate arm designs of the diamond sections are described below with reference to other embodiments.

A fringe mutual capacitance 218 can also be formed between the diamonds in the stimulated drive lines and the adjacent sense line diamonds. Fringe mutual capacitance 218 between adjacent diamonds can be of roughly the same order as the mutual capacitance formed between drive and sense lines separated by a substrate. Fringe mutual capacitance 218 between adjacent row and column diamonds can be desirable because a finger or other object may be able to block some of the fringing electric field lines and effect a change in the mutual capacitance that can be detected by the analog channels connected to the rows. As shown in FIG. 2b, there can be four "hot spots" of fringing mutual capacitance indicated at 218 that can be blocked by a finger or other object, and the more that a finger blocks, the greater the change in the mutual capacitance.

Figure 3:
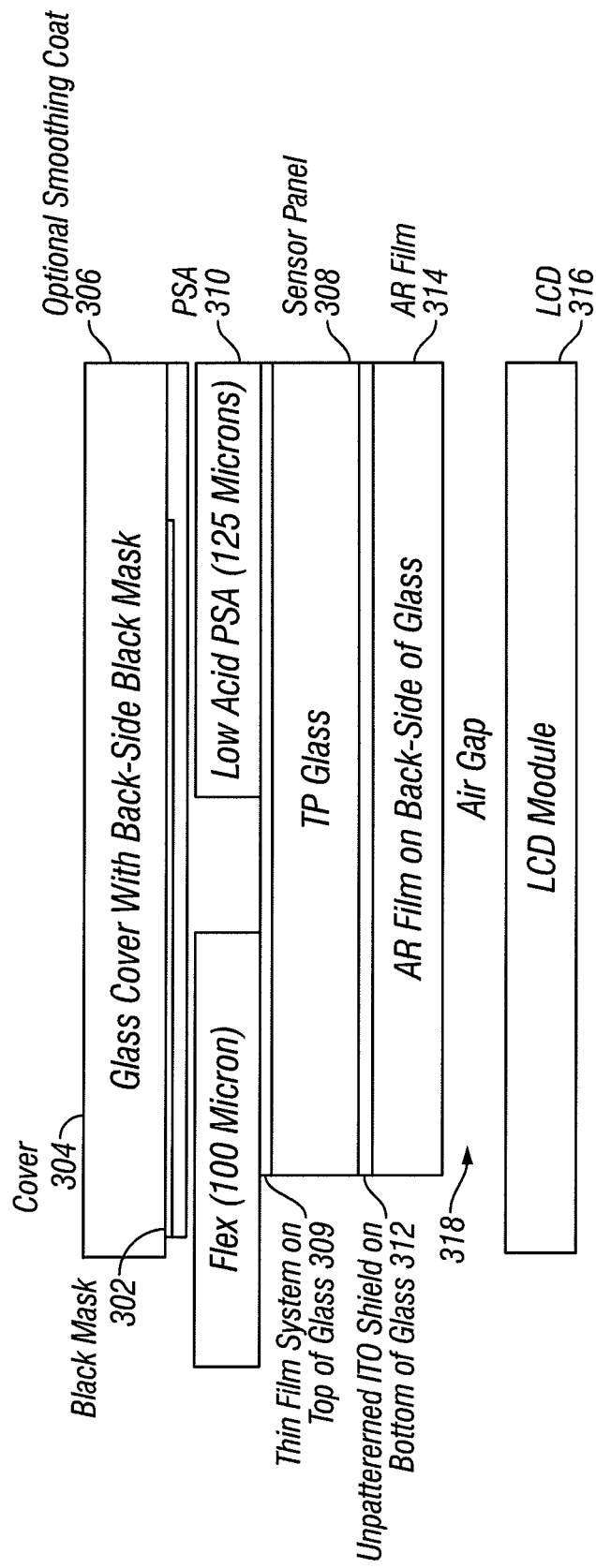
FIG. 3 illustrates exemplary touch screen stackup according to various embodiments.

FIG. 3 illustrates an exemplary touch screen stackup 300, including a touch sensor panel with drive 202 and sense 204 lines as described hereinabove formed in thin film layer 309, according to various embodiments. It should be understood, however, that the various touch pixel embodiments disclosed herein can also be implemented in other configurations including, but not limited to, on the back side of a cover glass, the back side of the touch panel (TP) glass, or integrated within a display module (e.g., OLED or LCD). In FIG. 3, black mask (or a mask of any color) 302 can be formed on a portion of the back side of cover 304, and an optional smoothing coat 306 can be applied over the black mask and back side of the cover. According to certain embodiments, before interconnectors 212 are formed, insulating material (not shown) can be applied over the conductive material (e.g., ITO) layer forming drive and sense lines 202 and 24. Interconnectors 212, which can be made of metal or other conductive material (e.g., ITO), can then be applied over the, extending beyond the insulating material to short together sense line sections 210. In alternative embodiments, the process of forming the ITO layer, insulating layer, and metal layer can be reversed, with the metal layer deposited first. In either embodiment, an optional layer of black mask (or other nonreflective material) can be applied over interconnectors 212 to reduce negative visual artifacts.

Touch panel 308 of the type described above, with drive lines, sense lines, insulating material and jumper (i.e., interconnectors 212) (at area 309 in FIG. 3) formed on the same layer on the same side of a glass substrate, can be bonded to the cover with pressure sensitive adhesive (PSA) 310. An unpatterned layer of ITO 312 can optionally be formed on the bottom of the glass to act as a shield. Anti-reflective film 314 can then be deposited over unpatterned ITO 312. LCD module 316 can then be placed beneath the glass substrate, optionally separated by air gap 318 for ease of repair.

Figure 4:
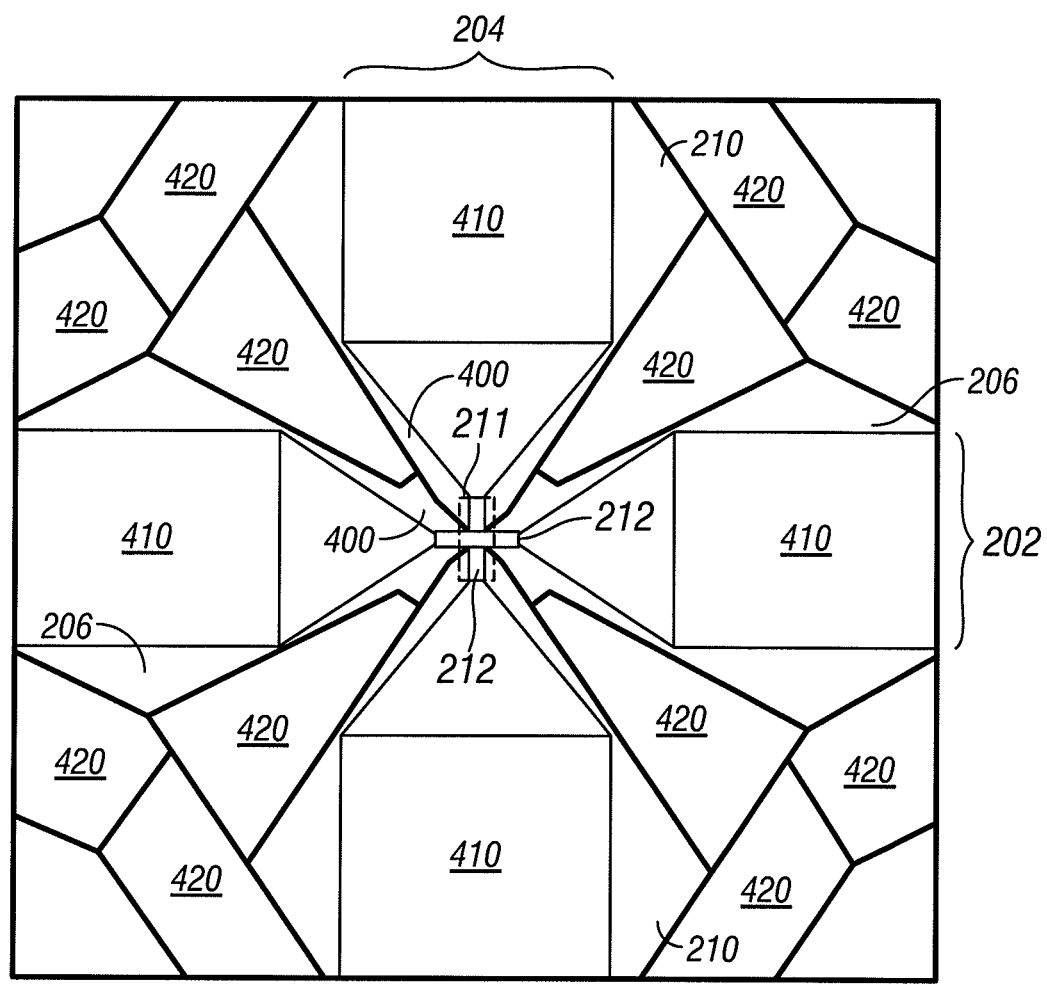
FIG. 4 illustrates exemplary interconnected drive line sections and sense line sections layered with thicker ITO, according to various embodiments.

FIG. 4 illustrates a close-up view of an intersection between a drive line 202 and a sense line 204 (i.e., a single pixel 230). As shown in FIG. 4, drive line sections 206 and sense line sections 210 can be formed of a thin layer of ITO (e.g., ~160-170 Angstroms), having a certain resistivity. Thicker ITO 410 (e.g., ~1000-1500 Angstroms), with a substantially lower resistivity as compared to the thin layer of ITO forming sections 206 and 210, can be deposited over at least a portion of one or more of the sections 206 and 210. According to an example, the thin ITO of sections 206 and 210 can have a resistivity of approximately 150 ohms per square, while the thicker ITO portions 410 can have a resistivity of approximately 30 ohms per square. Thus, according to this example, the resistivity of the portion of the drive lines 202 and sense line 204 having the layer of thicker ITO 410 can be reduced by a factor of three to approximately 50 ohms per square, as opposed to the 150 ohms per square of sections 206 and 210.

One of ordinary skill in the art would realize that various thicknesses and any number of layers of ITO may be deposited over at least part of sections 206 and 210. For example, a thicker ITO portion 410 can provide an even smaller resistivity. However, the thicker ITO portions 410 can cause discoloration, thereby reducing visual uniformity.

Each drive and sense line section 206 and 210 can include a variable size arm 400 at their narrowed ends, which can connect to another arm 400 of an adjoining section or can be electrically connected to interconnectors 212, which in turn can be connected to arm 400 of another sense line section 210, for example (e.g., to form sense line 204). According to various embodiments, one or more interconnectors 212 can be connected the thicker ITO 410 layered on the sections 206 and 210. Interconnectors 212 connecting sections 206 and sections 210 can be electrically insulated from each other, as described above, using insulating material 211. As further described above, interconnectors 212 can be formed of ITO of any thickness or an opaque metal having an even lower resistivity. In the case of using an opaque metal, a black mask (or other non-reflective material) can be layered over the opaque metal to mitigate visual artifacts.

In general, reducing the surface area of a section at its widest point (e.g., chopping off the corners of the diamond) where the sheet resistance in Ohms per square is lowest can reduce parasitic mutual capacitance without significantly increasing the overall resistance of the section. In addition, through RC time constant simulations, it has been determined that increasing the width of arm 400 as much as possible can increase conductance, thus reducing resistance.

Isolated "dummy" sections 420 can be formed between drive lines 202 and sense lines 204 according to various embodiments. Dummy sections 420 of the same composition (e.g., ITO) as sections 206 and 210 can be formed between drive lines 202 and sense lines 204 on the same layer as drive lines 202 and sense lines 204. Because of dummy sections 420, almost all areas of the substrate can be covered (i.e. substantially covered) with the same material, providing optical uniformity. In FIG. 4, repeating patterns of three isolated dummy sections 420 are illustrated for exemplary purposes; however, one of skill in the art would realize that any number of dummy sections 420 of any number of shapes may be formed on the substrate between drive lines 202 and sense lines 204.

A large parasitic mutual capacitance can be formed between stimulated drive line 202, for example, and dummy sections 420, but because dummy sections 420 are isolated, their voltage potential can move along with stimulated drive line 202 and can have minimal or no negative impact on touch detection. Reducing the size of each dummy section 420 in a particular area, thus increasing the number of dummy sections 420, can further reduce parasitic mutual capacitance.

Dummy sections 420 can also have a beneficial impact on touch detection. Because drive lines 202 and sense lines 204 can be formed on the same layer on the same side of a substrate, a large static mutual capacitance can be created between them. However, only a relatively small number of the electric field lines between drive lines 202 and sense lines 204 (those that extend beyond the cover of the touch sensor panel) are capable of being influenced by a finger or other object. Most of the electric field lines remain within the confines of the cover and are generally unaffected by a touch event. Therefore, a touch event may only cause a small change in the large static mutual capacitance, making it difficult to detect the touch event. However, with dummy sections 420 in place, instead of having static mutual capacitance form between drive lines 202 and sense lines 204 within the confines of the cover, parasitic mutual capacitance can instead be formed between the drive lines 202 and the dummy sections 420. In other words, the electric field lines emanating from the drive lines 202 that are incapable of being affected by a touch event are shunted to the dummy sections 420 instead of to the sense lines 204, effectively reducing the static mutual capacitance between the drive and sense lines that is incapable of being affected by a touch event. Removal of static mutual capacitance unaffected by a touch event can improve the touch detection capabilities of the panel, because a higher percentage of the remaining static mutual capacitance can be influenced by a touch event.

Figure 5:
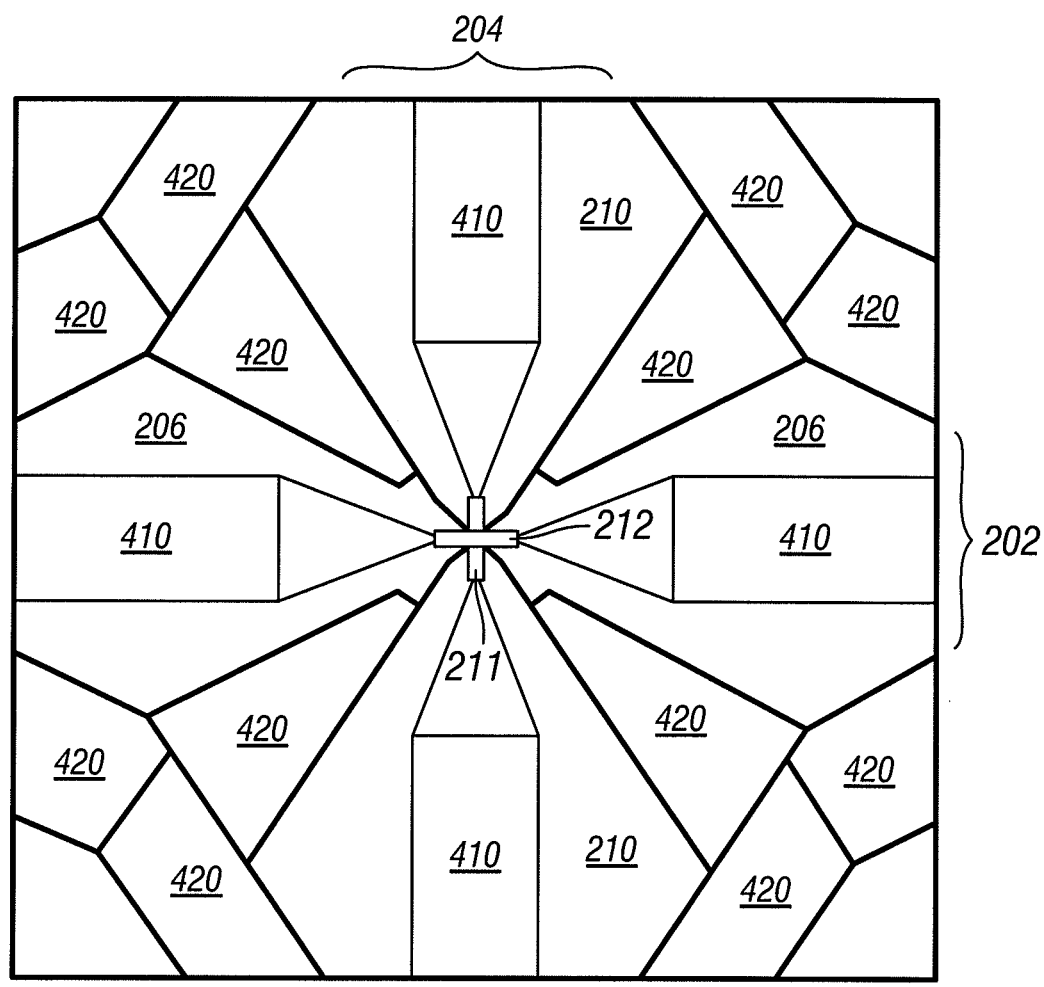
FIG. 5 illustrates exemplary interconnected drive line sections and sense line sections layered with one strip of thicker ITO, according to various embodiments.

As noted above, the thicker ITO portions 410 layered over sections 206 and 210 can cause discoloration and visual non-uniformity. Therefore, according to various embodiments, the coverage of the thicker ITO portions 410 may be limited. FIG. 5 illustrates a close-up view of drive line sections 206 and sense line sections 210 layered with thicker ITO sections 410, to a lesser extent than that illustrated in FIG. 4.

Figure 6:
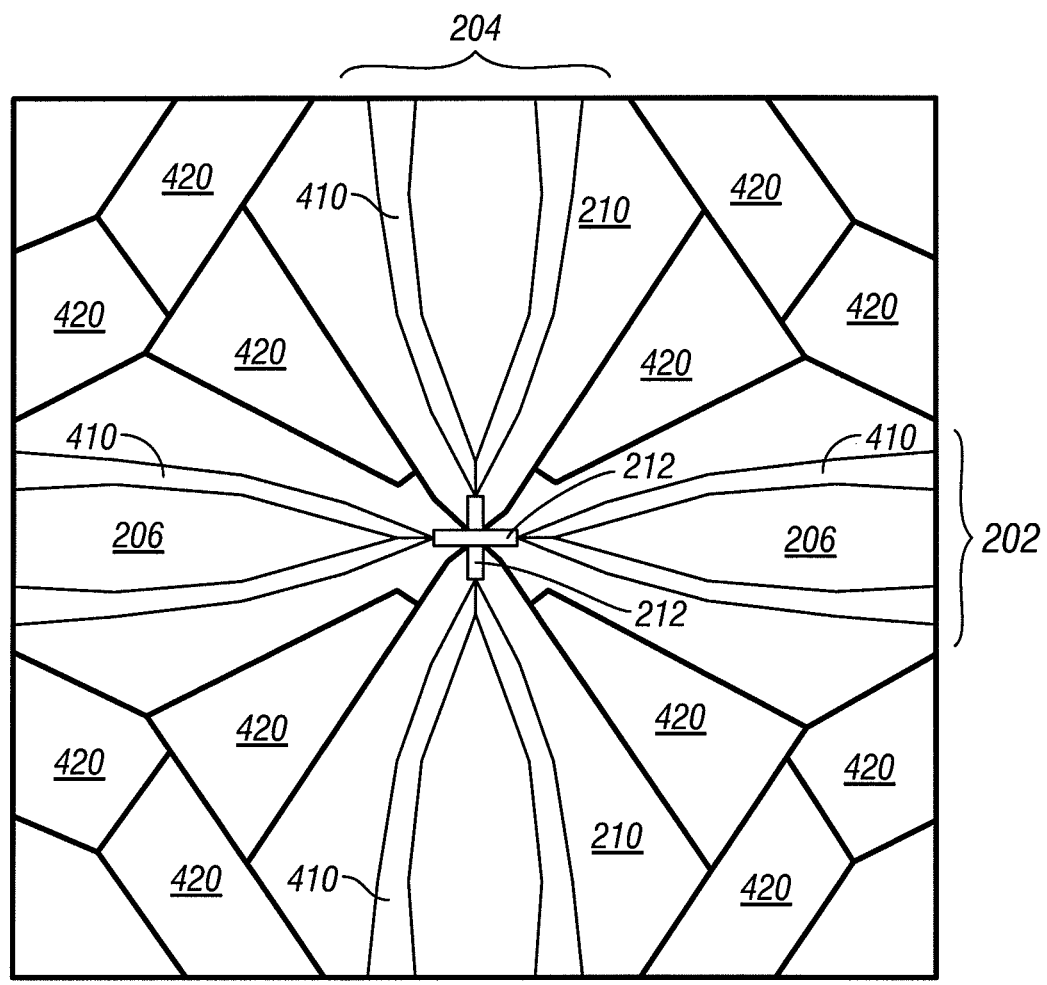
FIG. 6 illustrates exemplary interconnected drive line sections and sense line sections layered with two strips of thicker ITO, according to various embodiments.
Figure 7:
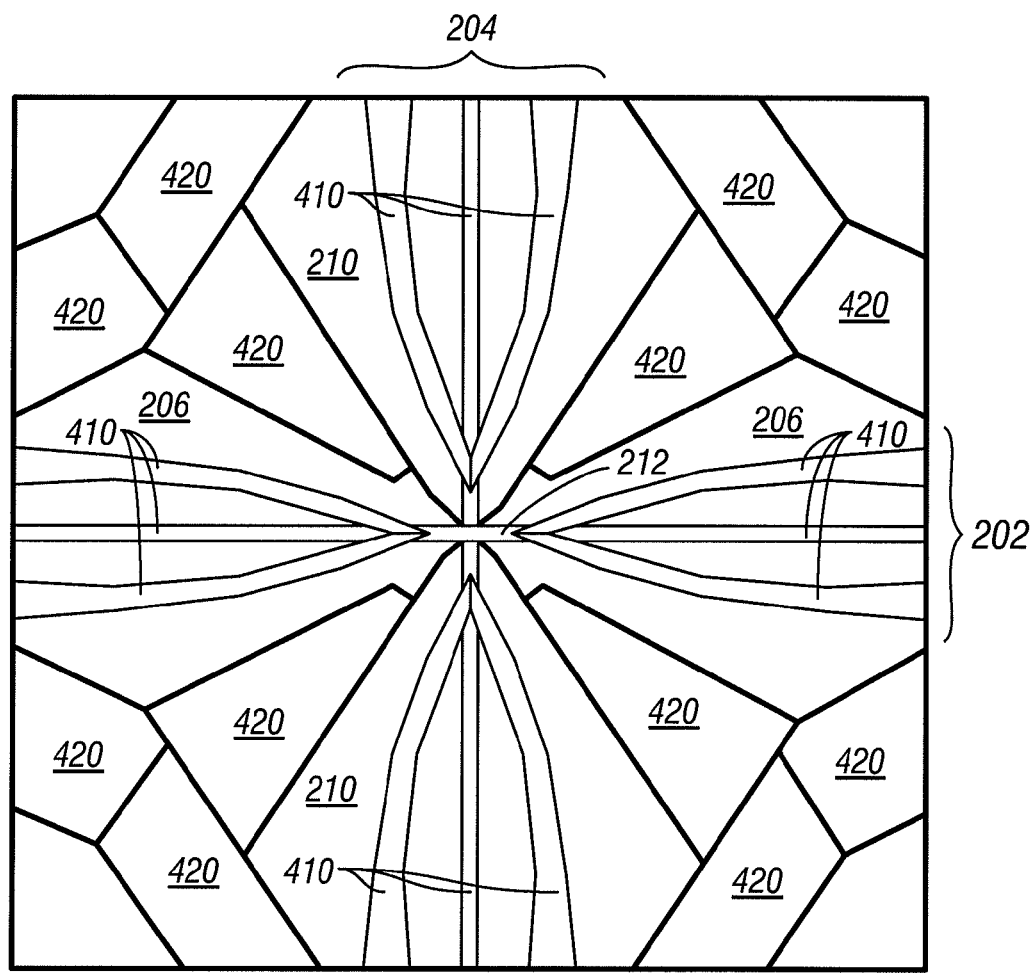
FIG. 7 illustrates exemplary interconnected drive line sections and sense line sections layered with three strips of thicker ITO, according to various embodiments.
Figure 8:
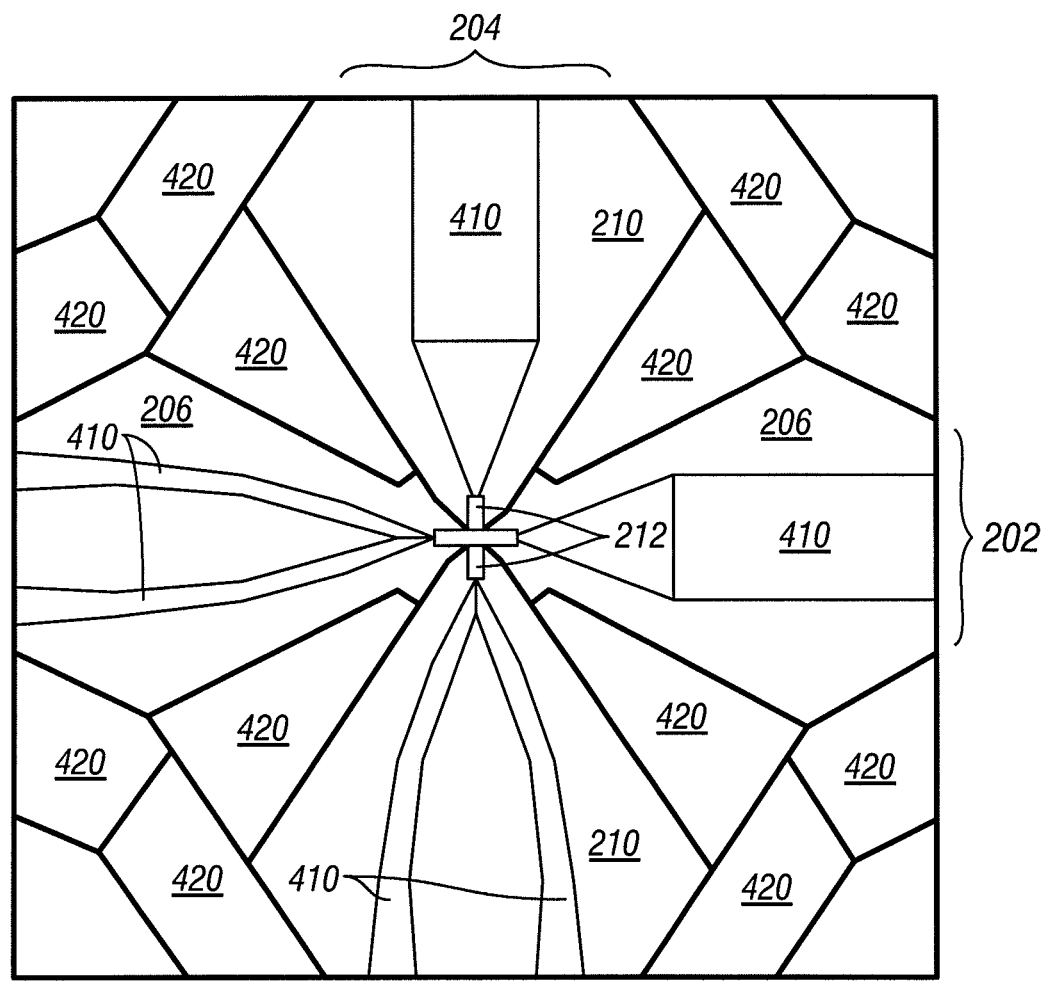
FIG. 8 illustrates exemplary interconnected drive line sections and sense line sections layered with various patterns of thicker ITO, according to various embodiments.

In other embodiments, any number of thicker ITO portions 410 may be deposited on sections 206 and 210. For example, FIG. 6 illustrates an exemplary intersection of drive line sections 206 and sense line sections 210, each layered with two thicker ITO 410 strips. Similarly, FIG. 7 illustrates an exemplary interconnection of drive line sections 206 and sense line sections 210 in which each of the sections can be layered with three thicker ITO 410 strips. Plural strips of thicker ITO 410 can further reduce discoloration of the touch screen caused by ITO thickness. Moreover, thicker ITO 410 strips can be zig-zagged in any direction in order to minimize visual artifacts when viewing the LCD, for example, through the touch panel sensor 124. The zigzag pattern can avoid Moiré or other negative visual effects that can result from the thicker ITO 410 strips being in alignment with the LCD structures.

Figure 9:
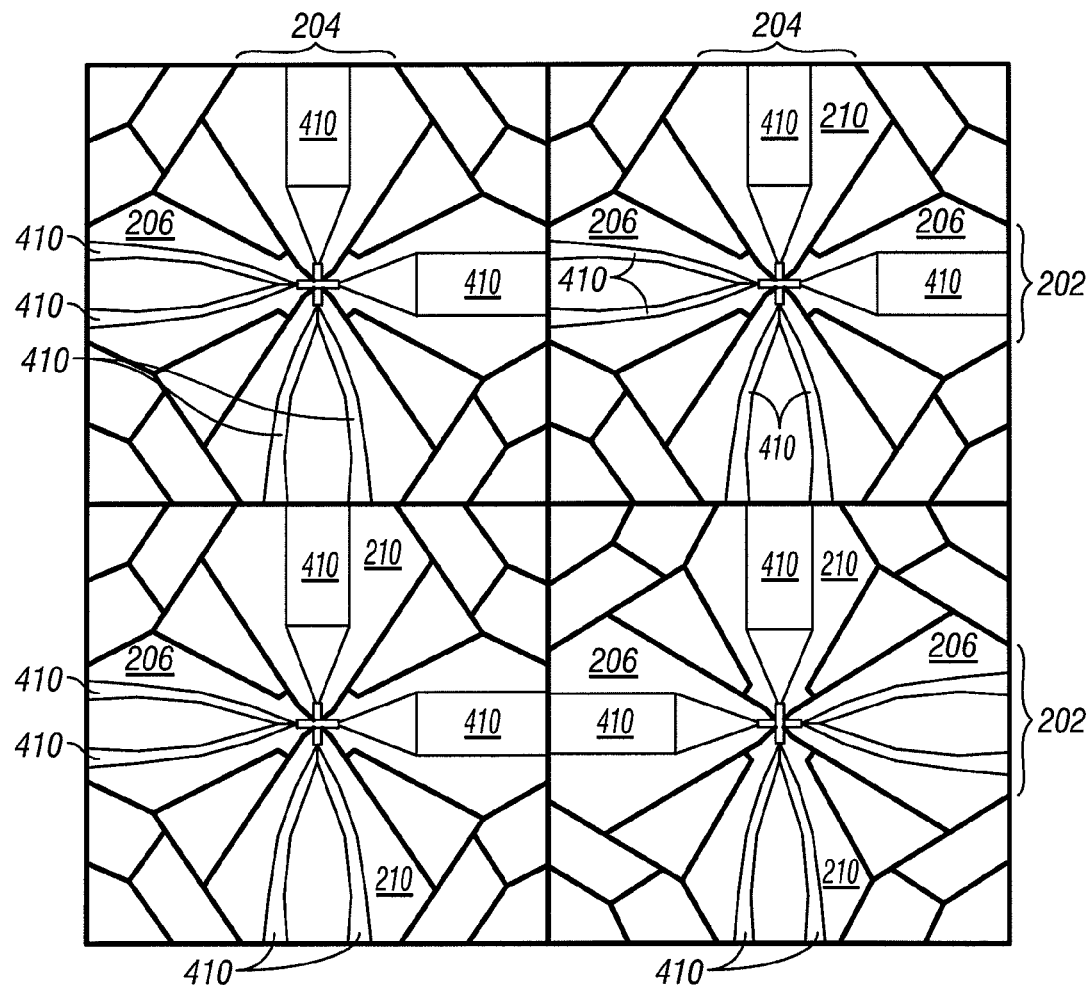
FIG. 9 illustrates exemplary grid of drive and sense lines, where the drive line sections and sense line sections are layered with various patterns of thicker ITO, according to various embodiments.

According to various embodiments, each section 206 and 210 of a pixel 230 can be layered with a different pattern of thicker ITO 410. As shown in FIG. 9, one drive line section 206 and one sense line section 210 can include a single thicker ITO 410 portion, while the other drive line section 206 and sense line section 210 can include plural thicker ITO 410 strips. The present disclosure is not limited to any particular pattern of thicker ITO 410 on any of the sections 206 and 210. According to various embodiments, each section 206 and 210 can be layered with a distinct pattern of thicker ITO 410.

FIG. 9 illustrates an exemplary grid of drive lines 202 and sense lines 204, according to various embodiments. As shown in FIG. 9, each pixel 230 can have a distinct arrangement of sections 206 and 210 layered with distinct patterns of thicker ITO 410.

Figure 10:
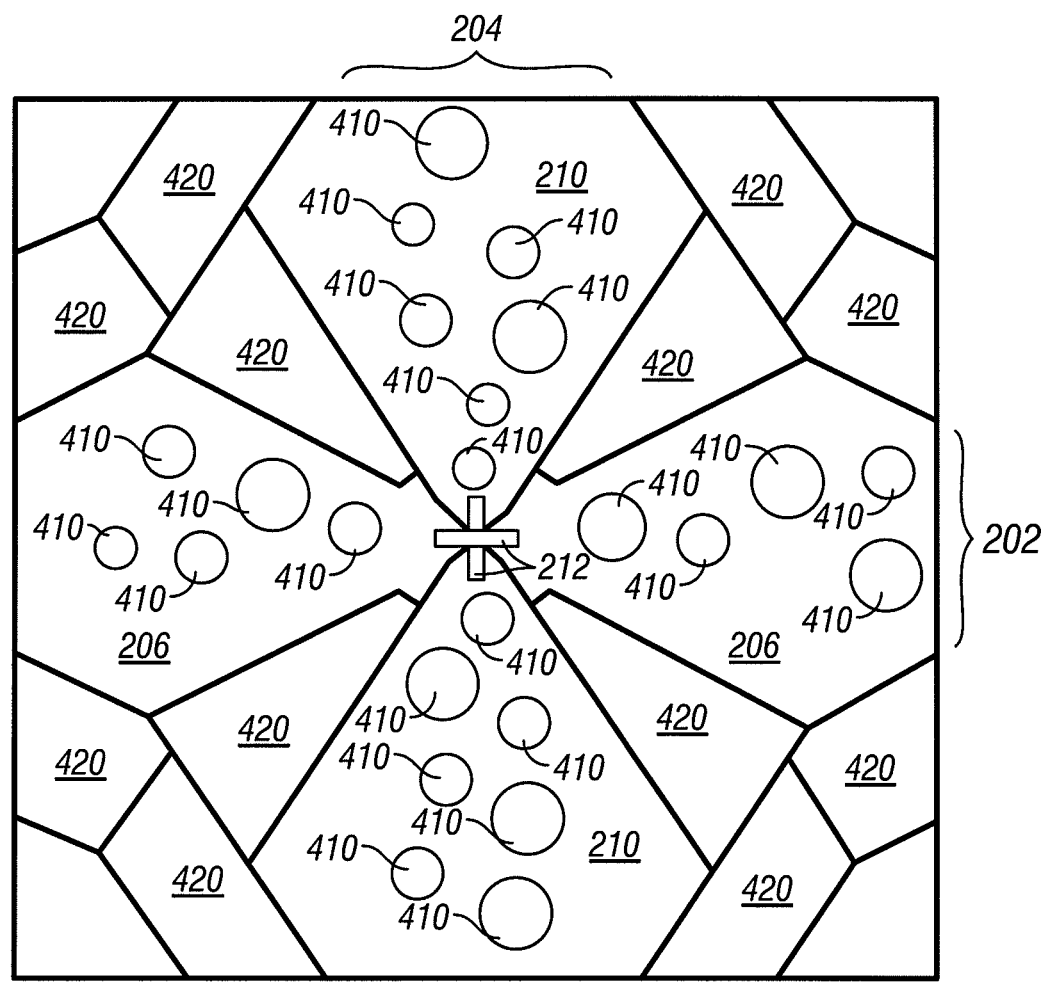
FIG. 10 illustrates exemplary interconnected drive line sections and sense line sections layered with incongruous sections of thicker ITO, according to various embodiments.

According to various embodiments, drive line sections 206 and sense line sections 210 can be layered with incongruous and/or disjointed sections of thicker ITO 410. As shown in FIG. 10, each section 206 and 210 can be layered with random and inconsistent patterns of thicker ITO 410. Although FIG. 10 illustrates circular-shaped thicker ITO 410 portions, any shape or pattern of thicker ITO 410 portions can be layered over sections 206 and 210. In the exemplary embodiment depicted in FIG. 10, interconnects 212 can be connected directly to the thin ITO parts of sections 206 and 210. However, in other embodiments not shown in FIG. 10, interconnectors 212 can connect drive line sections 206 and sense line sections 210 by being electrically connected directly to the layered thicker ITO 410.

Figure 11A:
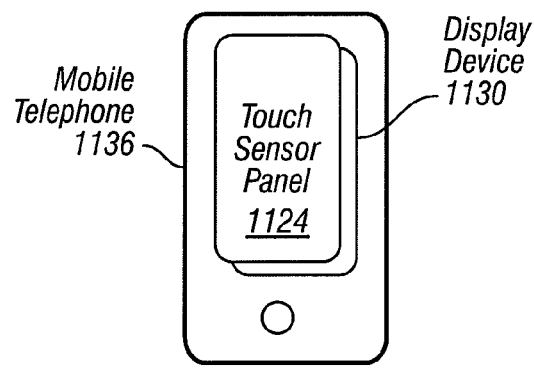
FIG. 11(a) illustrates an exemplary mobile telephone that can include a touch sensor panel according to the various embodiments described herein.
Figure 11B:
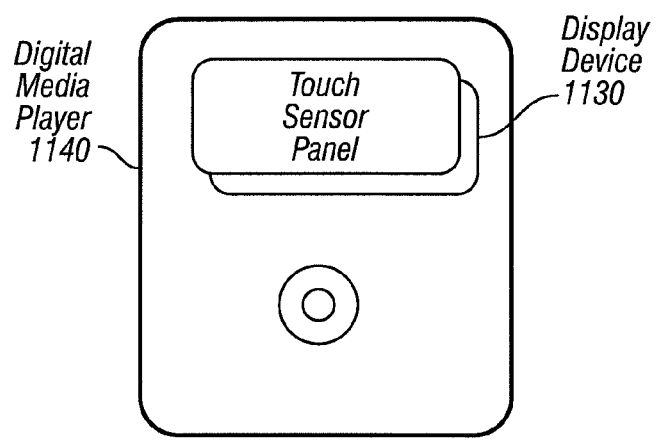
FIG. 11(b) illustrates an exemplary digital media player that can include a touch sensor panel according to the various embodiments described herein.
Figure 11C:
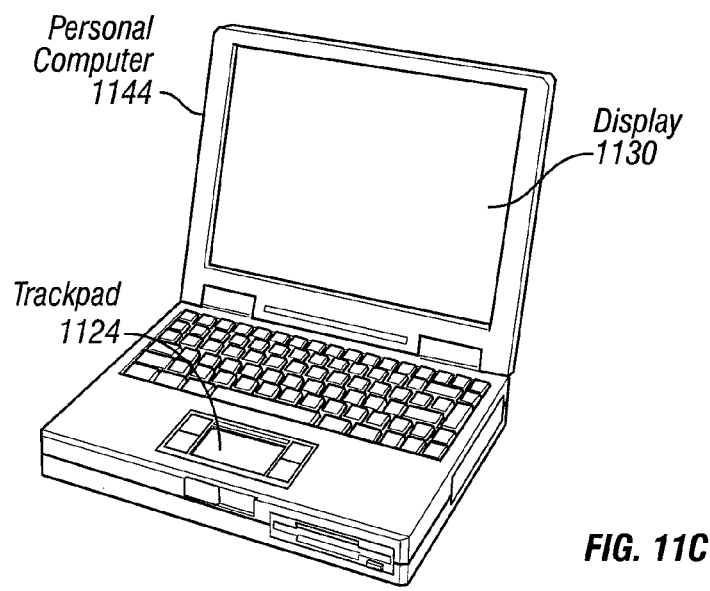
FIG. 11(c) illustrates exemplary personal computer that can include a touch sensor panel according to the various embodiments described herein

FIG. 11(*a*) illustrates an example mobile telephone 1136 that can include touch sensor panel 1124 and display device 1130, the touch sensor panel including a touch pixel design according to one of the various embodiments described herein.

FIG. 11(*b*) illustrates an example digital media player 1140 that can include touch sensor panel 1124 and display device 1130, the touch sensor panel including a touch pixel design according to one of the various embodiments described herein.

FIG. 11(*c*) illustrates an example personal computer 1144 that can include touch sensor panel (trackpad) 1124 and display 1130, the touch sensor panel and/or display of the personal computer (in embodiments where the display is part of a touch screen) including a touch pixel design according to the various embodiments described herein.

While various embodiments have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

What is claimed is:

1. A touch sensor panel, comprising:
   a plurality of drive lines and sense lines, each drive and sense line formed from an interconnected plurality of sections of conductive material having a first resistivity, the drive and sense lines configured to form an array of capacitive touch sensors;
   a first layer of a substantially transparent conductive material deposited over at least part of the plurality of drive and sense lines in a visible area of the touch sensor panel; and
   a plurality of interconnectors configured for connecting the plurality of conductive sections in the drive and sense lines and enabling the plurality of drive and sense lines to cross over each other to form the array of mutual-capacitance touch sensors.

2. The touch sensor panel of claim 1, further comprising:
   at least one dummy section, having the first resistivity, disposed in an area of the touch sensor panel around and electrically isolated from the plurality of drive and sense lines.

3. The touch sensor panel of claim 1, wherein at least one of the plurality of interconnectors is formed from an opaque metal.

4. The touch sensor panel of claim 3, wherein an opaque mask is layered over the plurality of interconnectors.

5. The touch sensor panel of claim 1, wherein the first layer of substantially transparent conductive material has a second resistivity lower than the first resistivity.

6. The touch sensor panel of claim 1, wherein at least one of the plurality of interconnectors is connected directly to at least one of the conductive sections of at least one of the plurality of drive lines and the plurality of sense lines.

7. The touch sensor panel of claim 5 wherein at least one of the plurality of interconnectors is connected to the deposited substantially transparent conductive material, having the second resistivity.

8. The touch sensor panel of claim 5, further comprising:
   a second layer of the substantially transparent conductive material, having the second resistivity, deposited over at least part of the first layer of the substantially transparent conductive material having the second resistivity.

9. The touch sensor panel of claim 1, wherein the touch sensor panel is incorporated within a computing system.

10. A computing device including a touch sensor panel, the touch sensor panel comprising:
    a plurality of drive lines and sense lines, each drive and sense line formed from an interconnected plurality of sections of conductive material having a first resistivity, the drive and sense lines configured to form an array of capacitive touch sensors;
    a first layer of a substantially transparent conductive material deposited over at least part of the plurality of drive and sense lines in a visible area of the touch sensor panel; and
    a plurality of interconnectors configured for connecting the plurality of conductive sections in the drive and sense lines and enabling the plurality of drive and sense lines to cross over each other to form the array of mutual-capacitance touch sensors.

11. The touch sensor panel of claim 5, wherein at least one of the plurality of interconnectors is formed from the same material as the substantially transparent conductive material, having the second resistivity.

12. The computing device of claim 10, wherein the first layer of substantially transparent conductive material has a second resistivity lower than the first resistivity.

* * * * *